United States Patent [19]
Robinson

[11] Patent Number: 5,513,852
[45] Date of Patent: May 7, 1996

[54] TIME TO WIN

[76] Inventor: Natalie F. G. Robinson, 12104 Magee Ct., Bowie, Md. 20720

[21] Appl. No.: 499,660

[22] Filed: Jul. 7, 1995

[51] Int. Cl.⁶ .................. A63F 9/00; G09B 3/00
[52] U.S. Cl. ............................. 273/431; 434/350
[58] Field of Search ................. 273/429, 430, 273/431, 432; 434/322, 324, 335, 336, 350, 351, 352

[56] References Cited

U.S. PATENT DOCUMENTS

| | | | |
|---|---|---|---|
| 2,562,179 | 7/1951 | Dorf | 434/352 |
| 2,654,163 | 10/1953 | Reynolds | 434/352 |
| 3,666,873 | 5/1972 | Pincus | 434/352 X |
| 3,699,671 | 10/1972 | Desmond | 434/350 |
| 4,678,188 | 7/1987 | Johnson | 273/430 |
| 4,799,678 | 1/1989 | Terzian et al. | 273/430 |
| 4,815,976 | 3/1989 | Krane | 434/237 |
| 4,998,736 | 3/1991 | Elrod | 273/349 |
| 5,193,818 | 3/1993 | Leeson | 273/400 |
| 5,251,904 | 10/1993 | Cruz | 273/243 |
| 5,453,015 | 9/1995 | Vogel | 434/350 |

Primary Examiner—William H. Grieb
Attorney, Agent, or Firm—Robert Halger

[57] ABSTRACT

A game of intellectual challenge with at least two players, a host and a plurality of clocks, one for each player and the host, wherein the game is played as a parlor game or on TV, wherein categories of questions are cast as numbered disks and the category is chosen by a designated player wherein the game is divided into two rounds and the winner of the first round is determined by the player whose clock is first moved to a 12 o'clock position, and the winner of a Jackpot in a bonus round is determined by one of the players that participates in the bonus round answering 12 of 16 questions correctly in a prescribed time period of 2.5 minutes.

11 Claims, 4 Drawing Sheets

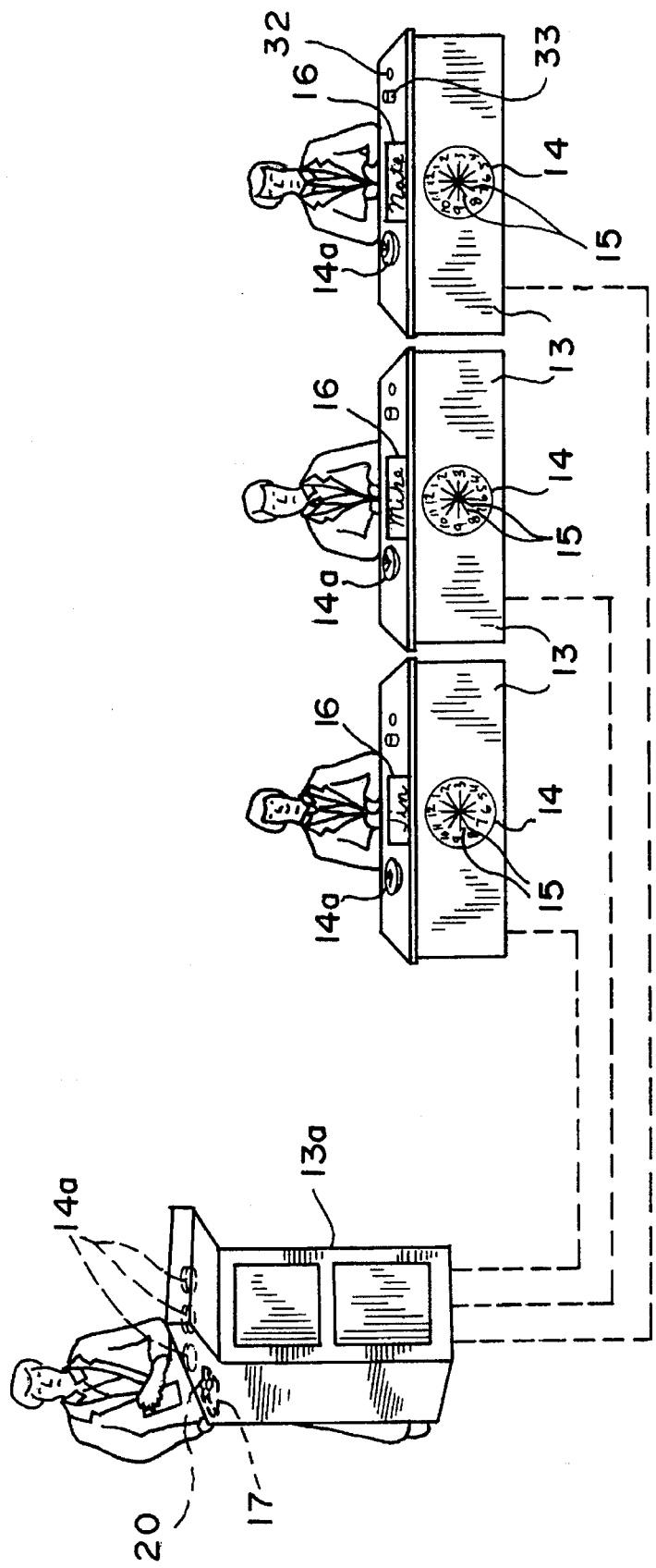

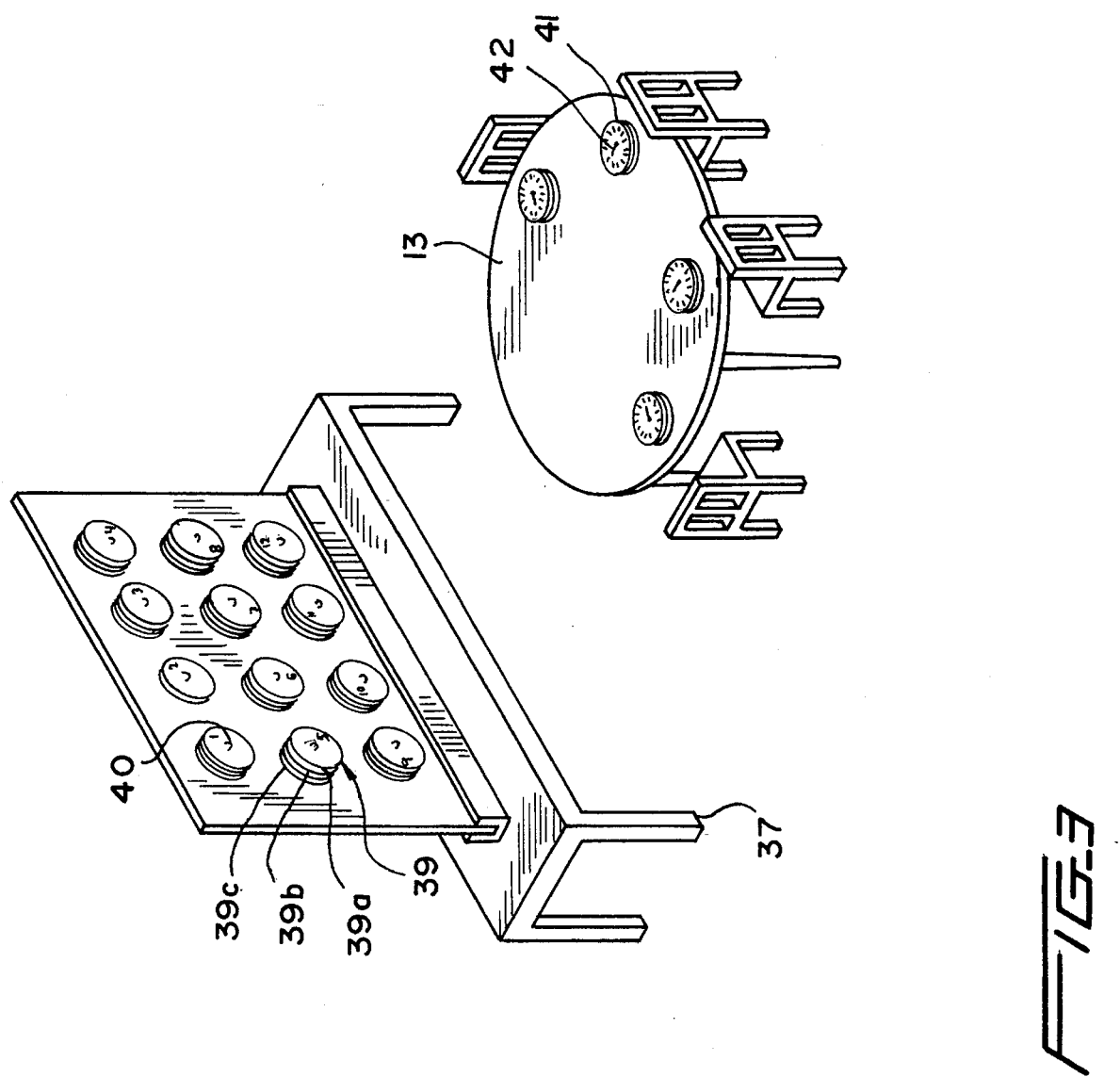

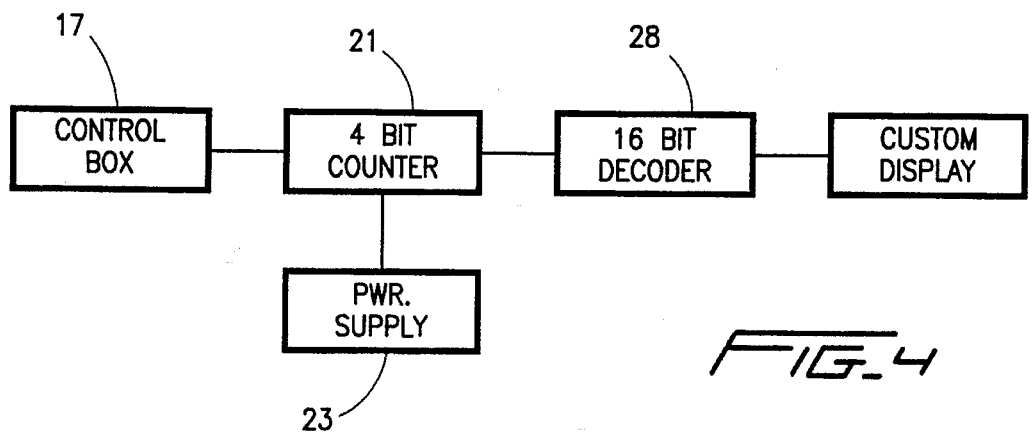
FIG._4
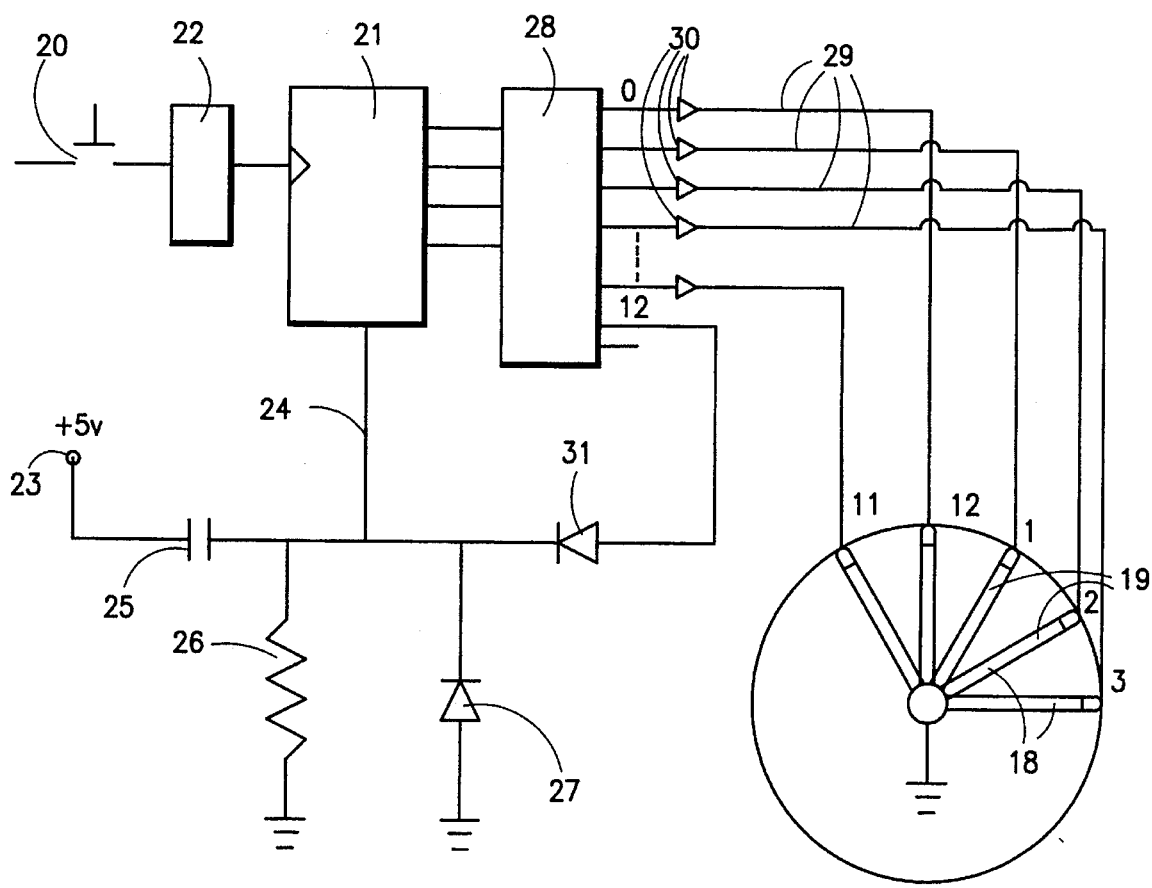
FIG._5

TIME TO WIN

FIELD OF INVENTION

The present invention pertains to a sedentary pastime in the form of a question and answer game played in the vicinity of a domestic setting or on television.

BACKGROUND OF THE INVENTION

There are any number of recreational games being played today either at home or on television. Exemplary of the art: U.S. Pat. No. No. 4,678,188, which is a question and answer game particularly adapted for a restaurant. A cube which can be held in the hand, has side surfaces each of which contains questions. On the top of the cube is a pointer with a surface below broken up into quadrants. Where the pointer stops after a spin, determines which person corresponding to a particular side surface is to answer the questions. On each side surface there is a narrow slot that acts as a window. Slidably adjacent the side surface and behind the slot is a card that contains answers to the questions on the side surface. When the card is moved up or down, answers to the particular question can be seen through the slot.

U.S. Pat. No. 4,799,678 is concerned with providing an electronic game playing device with an animated character and synthesized voice. A base for the character is like a stage and houses electronic components and a grid of indicator lights plus a touch switch pad of 32 squares and individual player buttons, Animation of different features of the character are powered by a single motor. As shown in the flow chart, input from player buttons are communicated to a microprocessor through a header. The 32 switches of the touch pad input to the microprocessor through another header. At the start players are requested to indicate by depressing the appropriate number of buttons how many players there are.

Then the players identify themselves by initials or other means by pressing down on the appropriate letters of the touch pad. An automatic routine asks the players what game they want to play. Game modules could also be plugged in to increase the number or types of games played. Letter Z represents a taped game that also can be selected. One of the games contained in the program is a guess the letter and eventually the game broadens to include an entire phrase such as a famous phrase.

U.S. Pat. No. 4,815,976 teaches an apparatus and method for learning about relationships and personalities among a group of participants. A plurality of players utilizes tokens on a board in combination with a plurality of color cubes, scoring sticks, secret answer wheels and question cards in one embodiment of the invention. Scoring and movement of the tokens is controlled by the roll of the dice and the players' knowledge of each other as revealed by the secret answering of questions related to the present and future feelings of the designated players. Scoring is achieved by insertion of relationship sticks into color cubes located on the tokens. The color personalities of the participants are reflected in each participant's sequential choice of color cubes for that participant's token. Therefore the choice affects the content questions to be asked and answered. There is a correlation between these selected questions and answers and the personality of the participant.

U.S. Pat. No. 4,998,736 is a question and answer game with a board in which pieces move onto spaces of a board and each space describes the action to be taken. The board contains multiple spaces in which a concert platform playing piece moves for each player from a start box to a final stage. Each space contains instructions which may include selecting a challenge or a rescue card. The rescue card provides a means for escaping various predicaments and the challenge cards ask questions which if answered correctly provide a bonus, but if answered incorrectly a monetary penalty. A pair of dice determines the number of spaces moved at each player's turn. Each player can obtain band member to be inserted on their playing piece. The band members are worth $50,000 each at the conclusion of each game when each player arrives at the final stage. Each player is provided with a supply of playing money. The object of the game is to become the headline act on the final stage by moving through various spaces on the board and recalling and announcing names of musical artists. The player with the most cash is declared the winner.

U.S. Pat. No. 5,193,818 is a game that can be played in the parlor or on TV. The game provides a plurality of distinct arbitrarily selectible information units, each of which is divided into two independently viewable sub-units. The first sub-unit has a visual representation of a different recognizable object and the second sub-unit is a visual representation of the identity of that object and questions and answers regarding the object. Means are provided for selection of a particular question by the player and for accumulating the player's score by proper answers to the questions. In the TV game, a quiz master will pick the top card from a deck and will hold up the card for the first person on his left to identify. If successful the player gets 5 points, goes on to roll the dice, answers further questions and accumulates more points. If the player fails to identify the famous person on the card, the opportunity passes to the next player in a clockwise direction with points increasing by 5 each time a player fails to identify the famous person until a successful identification is made. If all players fail the quizmaster reveals the name and the card goes to the bottom of the deck. In the parlor game form the units comprise two sided cards, the first side displaying a photograph of an object and the second side the identity of the object and a plurality of questions and answers about the object.

U.S. Pat. No. 5,251,904 is directed to a board game having a continuous path with a plurality of categories indicated by various spaces within the path with each category directed to various procedures such as a pantomime, response to a trivia question, perform a charade or lose a turn. Limited times are available for response to each category wherein a card deck includes each category thereon for a performance by an individual or a team. A die member directs progression of the game. As indicated by the exemplary prior art, question and answer games have become very popular. Such games provide entertainment as well as furnish TV audiences with plenty of excitement. The games vary from board games wherein advances are made along a board in response to throwing of a die to a simple cube containing questions and answers located on each side thereof to an electronic game playing device having an animated character with a synthesized voice as host.

Most of the existing games have some educational value with a monetary award or simulated monetary award being given to the winner as determined by the number of correct answers, although a game has been designed to while away the time until service is received in a restaurant or another game has been created to gain psychological insight into peoples' personality.

SUMMARY OF THE INVENTION

The game of this invention has several unique aspects. Each person sits behind a desk with a clock located in the front wall of the desk and a clock on the desk, the clocks being electronically controlled for movement. The host or quizmaster stands at an elevated platform somewhat behind and to the side of the players and he will have a plurality of clocks each clock having a characteristic corresponding to the clock on each player's desk. In front of the players and the host is a support carrying 12 discs and numbered from 1 to 12. To the rear of the contest- ants and the host an attendant is positioned with a slide projector. The host chooses a first player by taking a deck of cards and asking each player to pick a card. The player with the highest card is the first to start the game. The designated player will then be asked to select a category as defined by the twelve numbers. The attendant will then project on the screen sequentially the three questions for that category. The host, who has a copy of the questions and answers for each category, will repeat the questions to the designated player. If the player is successful in answering all of the question in his selected category, his clocks will be advanced 15 minutes and he will receive $50 for each correct answer. The host then asks all of the contestants to state what was the theme common to all the previously asked questions. The players have an indicator such as a light or buzzer alongside the clock and the first player to actuate the indicator will have the opportunity to respond. If the player answers correctly, he/she will also receive $50 and his clock will also be moved ahead five minutes. On the other hand, once a player has advanced his clock 15 minutes or a multiple thereof, he/she is subject to a penalty of five minutes if he/she should fail to answer the next successive question correctly. The host selects the next player in the same manner as described above, except that the first player will not be a participant in the subsequent selection. The last player will be selected by default. If the player should fail to answer all of the questions in his category, his clock would be moved only the number of minutes corresponding to the number of correct questions, that is five minutes for each question. All of the other players would be free to answer any of the questions that have not been answered correctly with the first other player to respond correctly becoming the designated player provided that the incorrect answer is the last of the three questions answered. Successive players would have to select a different category. The first player to score enough points to advance his clock to the 12 o'clock position is the winner of the first round, and that player then advances to the bonus round, or optionally all of the players could advance to the bonus round except that the winner of the first round will be the first designated player of the bonus round. If by chance all of the questions from behind the 12 numbered categories have been answered and no player has reached 12 o'clock on his/her score clock, the player with the highest score on his clock is the winner and advances to the bonus round, or optionally all the players could advance to the bonus round.

The player or players who participate in the bonus round must then answer 12 out of 16 questions in 2.5 minutes to win the $12,000 jackpot bonus. If the player does not answer 12 out of the 16 questions correctly in the time allotted, each question that is answered correctly is worth $25 which is added to his/her score from the previous round. When one group of contestants has finished the game, the questions behind each category will be changed.

BRIEF DESCRIPTION OF THE DRAWINGS

FIG. 2 is a view showing the contestants in a TV setting, seated behind their respective desks and the host located behind an elevated platform.

FIG. 3 is a view showing the arrangement of the players in a domestic setting.

FIG. 4 is a block diagram showing the organization of the operation.

FIG. 5 is a schematic showing the connection of the electronic control to one set of clocks for one contestant.

DETAILED DESCRIPTION OF THE INVENTION

Figure 1:
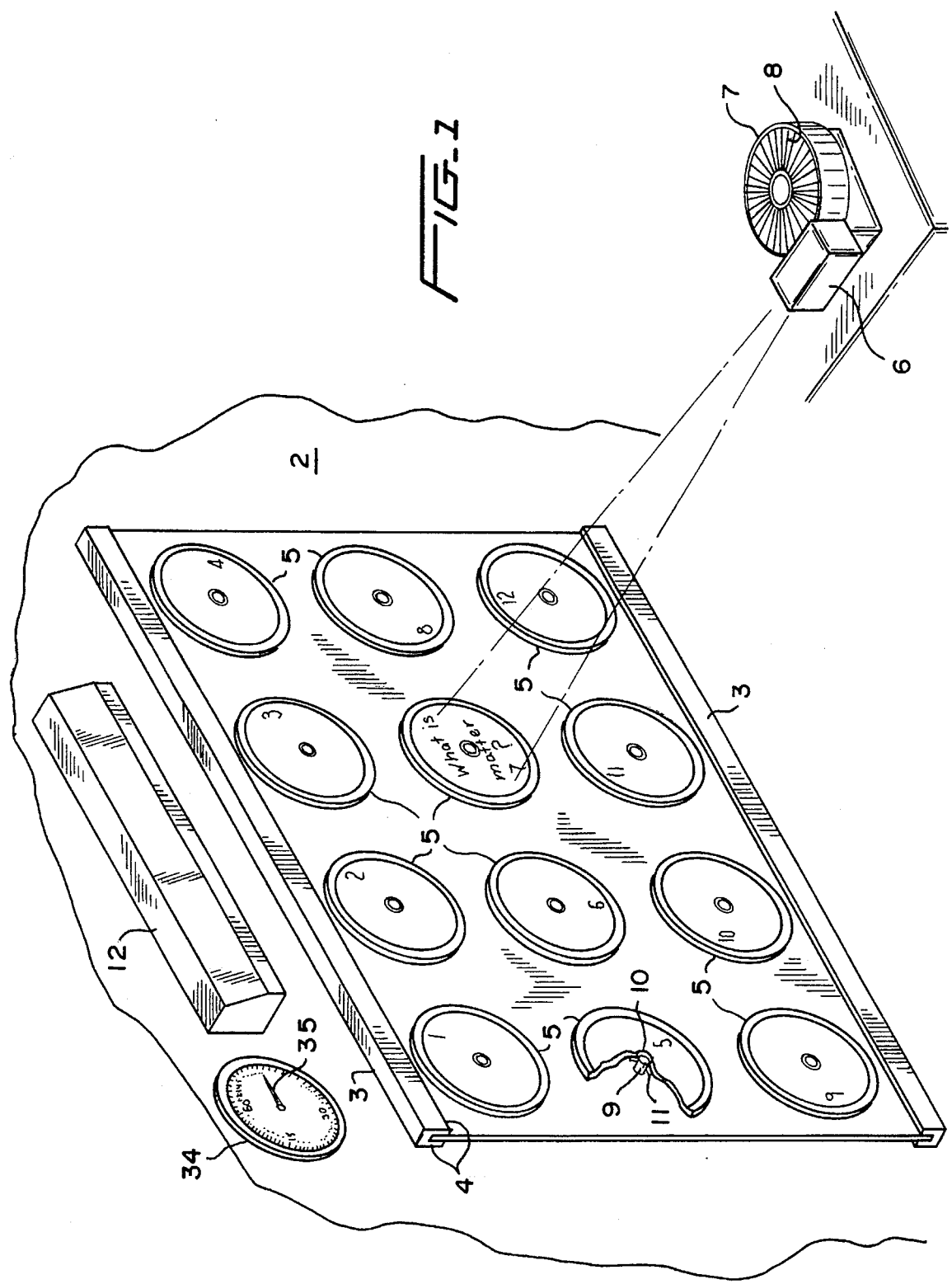
FIG. 1 is a panel showing the 12 posted categories.

FIG. 1 shows a panel that is supported on a wall 2. Fixed to the wall are a pair of channels 3, an upper channel having legs 4 facing downwardly and a lower channel having legs facing upwardly. The channels serve as support for the panel which is slid between the set of channels when a game is to start. The panel is 7.5 feet wide and 3.5 feet long. Disks 5, which are mounted on the panel, are 1 foot in diameter and from center to center the distance between each disk is 18 inches. The longitudinal distance from the edges of the panel to the center of the disk is also eighteen inches and the lateral distance from the top or bottom of the panel to the center of the disk is 9 inches. The disks are arranged in rows of 4 and columns of 3. The disks are consecutively numbered from 1 to 4 in the first row, 5 to 8 in the second row and 9 to 12 in the last row. An attendant is positioned behind the contestants at a table on which there is a slide projector 6. The projector contains a carousel 7 fitted with sets of slides 8, each set containing 3 questions for each category. The categories can contain a variety of questions on any subject known to man. For example, one category might contain a question on mathematics, another question on literature and a third on history; however, each category would contain a common theme, as for example time, in the said one category. At the end of the game for one group of contestants both the categories and the questions will be changed. For example if category 1 had light as its common theme for the first group of contestants, the theme might be mammals for the next group. Each disk is held fast on the panel by a threaded stud 9 that is screwed into the panel with the head of the stud on the back side of the panel. The disk has a perforation 10 slightly larger than the head of the stud. Adhesively bonded to the back side of the disk around the perforation is a flexible rubber ring 11 having a diameter slightly smaller than the stud so that the disk is held in a tight fit. At the same time it can be easily pulled over the stud because of its flexibility. The disks are made of cardboard or any other fairly rigid material and are painted with a light material, whereas the numbers are printed with black letters, with each number located at a position corresponding to where the minute hand of a clock would be after each question had been correctly answered. If necessary, the disks can be illuminated by a plurality of spaced fluorescent lights 12 placed above the panel. Preferably there would be 3 contestants seated behind desks 13 facing the panel, although more could be accommodated. The host or quizmaster would be positioned behind an elevated platform 13a to the right and to the rear of the contestants. On the top of his platform he would have copies of all the question and answers for the respective categories as well as questions and answers for the bonus round. Within the front of each desk a clock 14 with twelve hands 15 would be mounted, with each hand placed at five minute intervals and marked off with numbers 1 through 12. Above the clock would be the contestant's ID 16. Each contestant would have on top of his desk a similar but smaller clock 14a. Similarly on the host's platform there would be a number of clocks 14a corresponding to the number of contestants and each clock would have an ID that would correspond to that of the contestants. At the platform of the host, there would be a control box 17 that would electronically activate all the clock hands of the respective clocks of the contestants as well as the clocks of the host. Each hand has a tubular base 18 that contains an LED or a small bulb 19. The control box has a button 20 connected to a 4 bit counter 21 through a de-bouncing circuit 22 for each set of clocks. A 5-volt direct current (d.c.) power supply 23 is connected to each counter. Each counter has a reset input 24 connected to the 5-volt supply through a capacitor 25 and to ground through resistor 26 and diode 27 to assure a power-up reset condition. The counter output bits are connected in parallel to a 4-to-16 line decoder 28. The decoder is also connected to the 5-volt power supply and has lines 29 connected to each of the hands of the clock through drivers 30. The first line numbered 0 would be connected to the first hand of the clock, numbered 12, with successive lines connected to each of the remaining hands and line 11 connected to the 11 o'clock position. Since there would be no further connections to the hands of the clock, current in line 12 would return to reset input of the counter through diode 31. In operation the first designated player having answered a question correctly, the host would press the button on the control box corresponding to the player's clock on his desk and in the front of the desk and the five minute hand would light up. Similarly, the host's clock corresponding to the designated player would light up. As each question was answered correctly successive hands on the clocks would light up and in that way each player and the host would only have to look at their respective clocks to ascertain the score of each player.

At the commencement of the game and after the designated first player has been chosen as indicated above, he/she will be asked to choose a category. When this choice has been made, an attendant will project on the selected disk the first question and the host will repeat the question. This operation will be repeated as required by the rules of the game. After a series of questions has been completed, the host will ask any of the players to state the theme related to the three answered questions. Each player will have at his desk an indicator 32 such as a battery operated light or buzzer with a button type switch 33. The first player to actuate his indicator will answer the question. When the winner of the first round has been determined, the host will conduct the questioning for the bonus round. The game can be played with only the winner of the first round being eligible or all of the players can participate, except that the winner of the first round will be the first designated player. A clock 34 with second hand 35 and graduated in seconds running from 1 through 60 will be affixed to the wall above the panel. At the commencement of questioning, the host will activate the clock through bottom 20a on the control box which will be programmed to run for 2.5 minutes. Every time a question is answered correctly, the quizmaster will make a tally. If the contestant succeeds in answering at least twelve questions successfully, the tally would continue till the end of the questions, whereupon the host would pronounce the contestant winner of the "Jackpot". Otherwise the total number correctly answered questions would be awarded a value of $25 for each correct answer.

While the illustration has been made for a game to be shown on TV, the game could also be played in a domestic setting. In such a case one person could be chosen for one game to be the host. A stand 37 facing the players would be erected and a panel 38 placed on the stand. A series of numbered disks 39 would be arranged as on the above described panel except that each disk would be not be an integral part of the panel. Instead hooks 40 corresponding to the number of categories would be screwed into the panel and each disk would be suspended therefrom with a set of questions on underlying disks 39a, 39b and 39c. Whenever a contestant had chosen a particular category, the numbered disk would be removed from the panel and as each question on the underlying disk had been answered, that disk would also be removed. Each contestant would have a simulated clock 41 with numbers running from 1 through 12 each number representing five minute intervals. A hand 42 on the clock would be manually operated and each contestant would be responsible for keeping the score as represented by the correct time on his/her clock, although the host would be the final arbiter as to the winner. Instead of money each player who answered the corrections correctly could be issued certificates with the value posted thereon. However the players could decide to use chips as in a card game and the chips could be given a monetary value. As in the game played on TV, either just the winner of the first round or all of the players would be eligible for the second or bonus round, except that the winner of the first round would be the first player to start and if he were successful in answering all 16 questions, the game would end. Otherwise the player with the next highest score in the first round would be the second contestant and the same rules would apply.

In accordance with the objectives of the invention there has been provided a new game that may be played as a television game or a parlor game. While the invention has been described with specific embodiments, it should be obvious that many modifications and variations will be apparent to those skilled in the art in accordance with the detailed description.

I claim:

1. A game of intellectual challenge designed for the participation of at least two players comprising a panel containing categories as represented by numbered disks mounted on said panel, said disks being consecutively numbered from 1–12 said disks being arranged as rows, each said row containing four disks, each said numbered disk displaying sequentially three questions, a host containing a replica of said numbered categories, said questions pertaining thereto and answers to said questions, said players being seated adjacent each other with separate clocks, said clocks having at least one hand and being graduated with numbers 1 through twelve, each number representing five minutes, means to control the indication of the position of said hand with respect to the numbers on said clocks, a designated first player chosen by the host to start the game, said player choosing any one of the 12 categories as represented by the numbered disks, said player's clock being advanced five minutes for every correct answer to the question in the selected category, each successive designated player following the same procedure, a winner of a first round of the game determined by the first player's clock to be advanced to the 12 o'clock position, said winner of the first round proceeding to a bonus round, a stop clock controlled by the host and graduated in seconds from 1 to 60 and being stopped after 2.5 minutes, said host reciting in rapid succession 16 questions to be answered by said winner of the bonus round within said 2.5 minutes, correct answers being tallied by said host, and a jackpot award given said designated player upon answering at least 12 of said 16 questions correctly within said minutes.

2. The game of claim 1 wherein the winner of the first round along with the other players advances to the bonus round, said winner of the first round being selected as the first designated player and wherein any player whose clock has advanced to a fifteen minute position or a multiple thereof receives a penalty of five minutes if he responds incorrectly to a successive question asked by the host.

3. The game of claim 1 or claim 2 wherein each set of questions that comprises a category can be selected from a wide variety of subject matter, said category being defined so that each set of questions has a common theme, wherein after a player has answered the questions from his selected category, the host will question all the players as to what the theme of said category is, and the first player to answer correctly will receive an additional award and his clock will also be advanced an additional five minutes.

4. The game of claim 3 wherein said Game is to be played as a television game, said questions are displayed sequentially on said numbered disk by a projector having a carousel supplied with a plurality of sets of slides, each set containing three questions pertinent to a selected category and said panel is supported on a wall facing said players, said panel being 3.5 Feet long by 7.5 feet wide, each said disk being made of a rigid, brightly colored material, about 1 foot in diameter, each disk being perforated at its center, a stud mounted on said panel and passing through each disk at said center, a flexible rubber ring being bonded to each of said disks on a back side thereof and having a diameter slightly smaller than that of said stud, said disks fitting snugly on said stud and being easily removable therefrom.

5. The game of claim 4 wherein said players are seated at desks closely adjacent each other and said host is located at an elevated platform to the right and somewhat behind said players, each said player having said clock mounted in the front of his desk and on his desk, a control box mounted on the platform of said host, said control box having switches for electronically activating said clocks, said clocks graduated with numbers running from 1 to 12, each number representing a five minute interval, said clocks having corresponding hands for each number, said hands lighting up sequentially and displaying the number of minutes the clock has advanced in response to closing of one of said switches, and an indicator on each of said player's desks, said indicator that is first activated apprising said host of the player to answer a question that has been answered incorrectly by said designated player.

6. The game of claim 3 wherein said game is played as a parlor game, each of said players being seated at adjacent desks, a stand in front of said players supporting a panel, said panel having rows of spaced numbered disks independent of said panel but having means for being suspended thereon and 3 disks behind each of said numbered disks, each said disk containing a question thereon, each of said contestants containing a clock on his desk, said clock being numbered from one to twelve, each number representing five minutes, a manually movable hand on said clock, each of said players manually moving his indicator five minutes for every correct answer.

7. A method of playing a game of intellectual challenge with at least two players and a host, comprising a panel having three rows of numbered disks starting from 1 and ending at 12, each number representing a category of diverse subject matter, each said category having a common theme, displaying sequentially a set of three questions pertinent to a category on each numbered disk, choosing a designated first player by asking each player to select a card from a deck of cards, with the player having the highest card starting the game, requesting said first player to choose a category from one of the twelve numbers, prompting the designated player to respond to said displayed questions, and if the answer is correct, continuing the process until all the three questions have been answered, said player having a clock graduated in numbers from 1 to 12, each number representing a five minute interval, each player's clock being moved five minutes for every correctly answered question, choosing a second player in the same manner as described above, to pick another category, the procedure continuing until one of the players has reached 12 on the clock, the host declaring said one player to be the winner of the first round, said winner then advancing to a bonus round, said host calling upon said winner to answer correctly 16 questions in a prescribed time frame, an award being given for each correctly answered question of the first round and the bonus round, and the first round winner being awarded a jackpot if said first round winner answers at least 12 of the 16 questions correctly of said bonus round in said prescribed time.

8. The method of claim 7 wherein the game is played as a parlor game, the host is chosen by the players and awards given are either play money or amounts determined by the players and after the three questions of a chosen category have been completed, the players will be asked to state the theme of said category and the first player to respond receives an additional award and moves his clock an additional five minutes.

9. The method of claim 7 wherein if a designated player fails to answer any of his questions correctly, the said other players can respond and the player who answers correctly will receive the award and if said other players are responding to a third question, said player with the correct response will be the designated player for the next category and wherein if a player, who has had his clock advanced to a fifteen minute position or a multiple thereof, fails to answer a successive question correctly receives a penalty of five minutes.

10. The method of claim 7 wherein the game is played as a television game, and the award for each correctly answered question in said first round and said bonus round is respectively $50 and $25 the winner of the bonus round as determined by a correct response to 12 of the 16 questions receives $12,000.

11. The method of claim 7 wherein after a game has been completed by a group of players, the questions representing each numbered category are changed.

* * * * *